(12) United States Patent
Matolia et al.

(10) Patent No.: US 11,856,645 B2
(45) Date of Patent: Dec. 26, 2023

(54) PROXIMITY SERVICES PATH SELECTION AND SWITCHING

(71) Applicant: Apple Inc., Cupertino, CA (US)

(72) Inventors: Rohit R. Matolia, Surat (IN); Alosious Pradeep Prabhakar, Singapore (SG); Krisztian Kiss, Hayward, CA (US); Vijay Venkataraman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 263 days.

(21) Appl. No.: 17/593,483

(22) PCT Filed: May 21, 2021

(86) PCT No.: PCT/US2021/070591
§ 371 (c)(1),
(2) Date: Sep. 20, 2021

(87) PCT Pub. No.: WO2021/237246
PCT Pub. Date: Nov. 25, 2021

(65) Prior Publication Data
US 2022/0312176 A1  Sep. 29, 2022

(30) Foreign Application Priority Data

May 21, 2020  (IN) .............................. 202041021492

(51) Int. Cl.
*H04W 36/00* (2009.01)
*H04W 8/00* (2009.01)
*H04W 48/14* (2009.01)
*H04W 88/04* (2009.01)

(52) U.S. Cl.
CPC ........... *H04W 8/005* (2013.01); *H04W 36/03* (2018.08); *H04W 48/14* (2013.01); *H04W 88/04* (2013.01)

(58) Field of Classification Search
CPC ..... H04W 8/005; H04W 36/03; H04W 48/14; H04W 88/04
See application file for complete search history.

(56) References Cited

U.S. PATENT DOCUMENTS

2017/0230381 A1* 8/2017 Liang .................... H04W 60/04
2021/0392622 A1* 12/2021 Zhang ............... H04W 72/0453
(Continued)

OTHER PUBLICATIONS

Samsung, "Architectural solution for 5G_ProSe"; 3GPP SA WG2; S2-2000611; Jan. 7, 2020; 4 sheets.
(Continued)

*Primary Examiner* — Justin Y Lee
(74) *Attorney, Agent, or Firm* — Fay Kaplun & Marcin, LLP

(57) ABSTRACT

A user equipment (UE) is configured to connect to a next generation nodeB (gNB) and further UE. The UE determines that a triggering event has occurred, wherein the triggering event is based on a set of proximity services (ProSe) path selection and switching (PSS) policies, transmits a setup or update request to a direct discovery name management function (DDNMF) of a 5G core network, receives UE-specific policies based on the set of ProSe PSS policies, and switches from one of a PC5 interface or a Uu interface to another one of the PC5 interface or the Uu interface.

20 Claims, 8 Drawing Sheets

(56) References Cited

U.S. PATENT DOCUMENTS

2022/0322202 A1* 10/2022 Li .................. H04M 15/8016
2022/0345879 A1* 10/2022 Park .................. H04W 60/04

OTHER PUBLICATIONS

Samsung, "Solution to support Direct Communication Path Selection"; 3GPP SA WG2 Meeting #136; S2-1911344; Nov. 8, 2019; 3 sheets.
Ericsson, "ProSe Restricted Discovery in Model B with Match Report procedure initiated by Discoverer UE only"; 3GPP TSG SA WG3 (Security) Meeting #79; S3-151316; Apr. 19, 2015; 9 sheets.
Samsung et al., "Architectural solution for 5G_ProSe"; 3GPP SA WG2 Meeting #S2-136AH; S2-2001496; Jan. 16, 2020; 4 sheets.
3rd Generation Partnership Project, "Technical Specification Group Services and System Aspects; Study on system enhancement for Proximity based Services (ProSe) in the 5G System (5GS) (Release 17)"; 3GPP Standard; SA WG2, No. V0.30; Jan. 27, 2020; 73 sheets.

* cited by examiner

PROXIMITY SERVICES PATH SELECTION AND SWITCHING

BACKGROUND

Proximity services (ProSe) includes two features: (1) network-assisted discovery of user equipment (UEs) that wish to communicate with each other and are in close proximity to one another; and (2) facilitation of direct communication between UEs both with and without input from the network. Direct communication means a radio connection is established between the UEs without transmitting information via the network. As a result, network resources are saved and public safety communication in areas outside network coverage may be enabled.

In 5G new radio (NR), ProSe are expected to be an important system wide enabler to support various applications and services both in commercial and public safety domains. As an example, 3GPP TR 22.842 identified emerging Network-controlled Interactive services (NCIS) that share some commonality of requirements with public safety services and applications. For either form of services, supporting the requirements for throughput, latency, reliability or other service requirements requires employing path selection.

SUMMARY

Some exemplary embodiments include a computer readable storage medium comprising a set of instructions that when executed by a processor cause the processor to perform operations. The operations include determining that a triggering event has occurred, wherein the triggering event is based on a set of proximity services (ProSe) path selection and switching (PSS) policies, transmitting a setup or update request to a direct discovery name management function (DDNMF) of a 5G core network, receiving UE-specific policies based on the set of ProSe PSS policies, and switching from one of a PC5 interface or a Uu interface to another one of the PC5 interface or the Uu interface.

Other exemplary embodiments relate to a user equipment (UE) having a transceiver and a processor. The transceiver is configured to connect to a next generation nodeB (gNB) and further UE. The processor is configured to determine that a triggering event has occurred, wherein the triggering event is based on a set of proximity services (ProSe) path selection and switching (PSS) policies, transmit a setup or update request to a direct discovery name management function (DDNMF) of a 5G core network, receive UE-specific policies based on the set of ProSe PSS policies, and switch from one of a PC5 interface to connect with the further UE or a Uu interface to connect to the gNB to another one of the PC5 interface or the Uu interface.

Still further exemplary embodiments are related to an integrated circuit configured for use in a user equipment (UE). The integrated circuit includes circuitry configured to determine that a triggering event has occurred, wherein the triggering event is based on a set of proximity services (ProSe) path selection and switching (PSS) policies, circuitry configured to transmit a setup or update request to a direct discovery name management function (DDNMF) of a 5G core network, circuitry configured to receive UE-specific policies based on the set of ProSe PSS policies, and circuitry configured to switch from one of a PC5 interface to connect with another UE or a Uu interface to connect to a next generation NodeB (gNB) to another one of the PC5 interface or the Uu interface.

DETAILED DESCRIPTION

Figure 1:
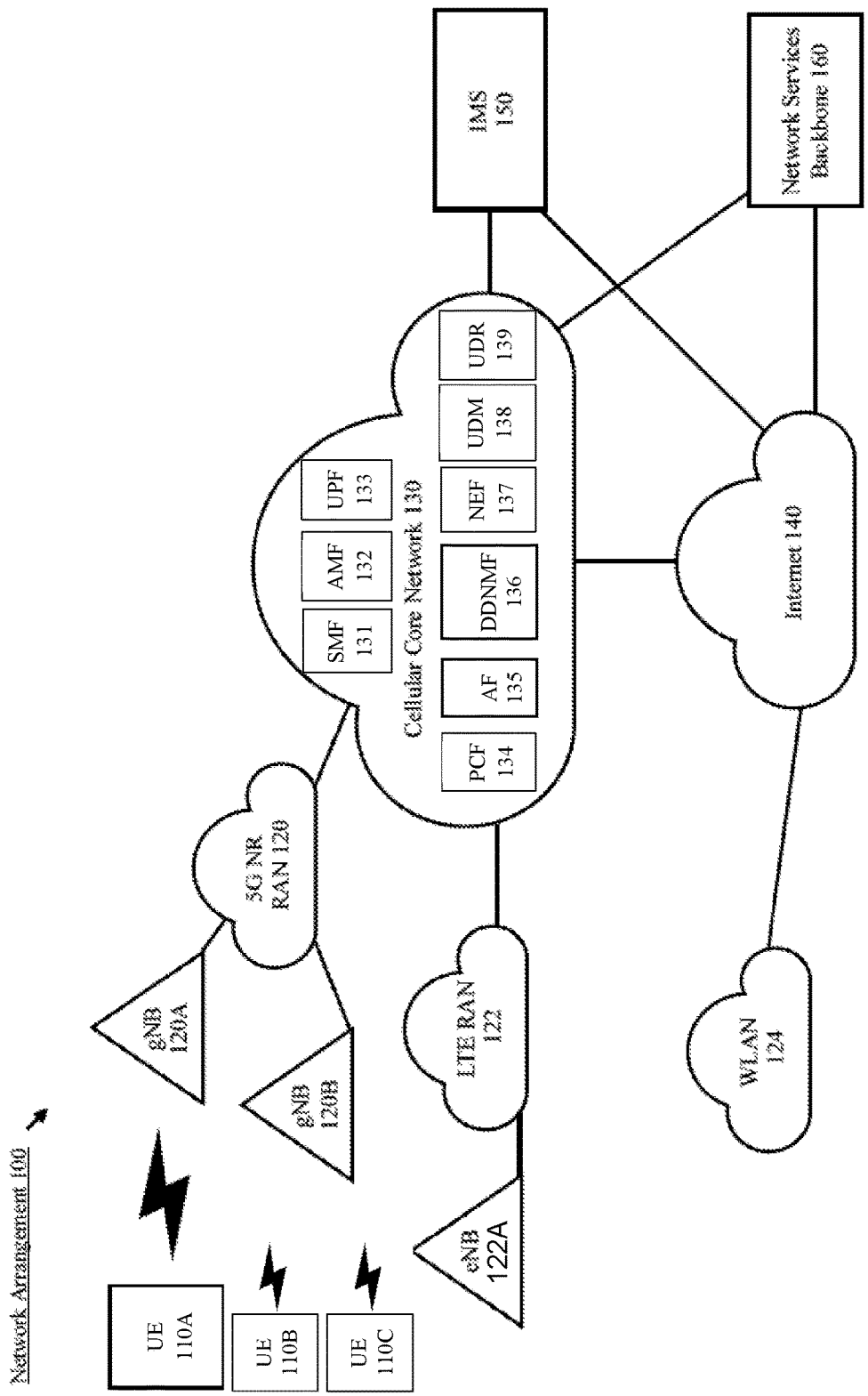
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to proximity services (ProSe) and more particularly, selection and switching of communication paths.

The exemplary embodiments are described with regard to a UE. However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

The exemplary embodiments are also described with regard to a network that includes 5G NR radio access technology (RAT). However, reference to a 5G NR network is merely provided for illustrative purposes. The exemplary embodiments may be utilized with any network that implements ProSe or an equivalent technology. Therefore, the 5G NR network as described herein may represent any network that includes the ProSe functionalities.

To improve the support of ProSe functionality, the appropriate direct communication path (or interface) may be selected by the UE based on a predetermined policy which may be configured by a network operator or assisted by the network when available. Current UE route selection policy (URSP) rules do not identify which service(s) apply to a particular UE. As such, the UE is left to determine for itself which are applicable. An issue that remains unaddressed with ProSe is how a 5G system (5GS) can support direct path selection and switching by the UE.

According to exemplary embodiments, an application function (AF) of the 5G core network may initiate the creation of ProSe path selection and switching (PSS) policies by a policy control function (PCF) also of the 5G core network. These policies guide the selection and switching by the UE of a communication path (Uu and/or PC5). In some embodiments, the switching between a Uu interface (universal mobile telecommunications system air interface between the UE and radio access network) and a PC5 interface (UE to UE interface) may be triggered or initiated by the network due to satisfying one or more of the PSS policies or due to an application triggering event. In some embodiments, the switching between Uu and PC5 may be triggered or initiated by the UE due to the satisfaction of one or more of the PSS policies.

FIG. 1 shows an exemplary network arrangement 100 according to various exemplary embodiments. The exemplary network arrangement 100 includes a first UE 110A, a second UE 110B, and a third UE 110C (collectively the UEs 110). It should be noted that any number of UEs may be used in the network arrangement 100. Those skilled in the art will understand that the UEs 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UEs 110 is merely provided for illustrative purposes.

The UEs 110 may be configured to communicate with one or more networks. In the example of the network configuration 100, the networks with which the UEs 110 may wirelessly communicate are a 5G New Radio (NR) radio access network (5G NR-RAN) 120, an LTE radio access network (LTE-RAN) 122 and a wireless local access network (WLAN) 124. However, it should be understood that the UEs 110 may also communicate with other types of networks and the UEs 110 may also communicate with networks over a wired connection. Therefore, the UEs 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UEs 110 may connect to the 5G NR-RAN 120 via the gNB 120A. The gNB 120A may be configured with the necessary hardware (e.g., antenna array), software and/or firmware to perform massive multiple in multiple out (MIMO) functionality. Massive MIMO may refer to a base station that is configured to generate a plurality of beams for a plurality of UEs. During operation, the UEs 110 may be within range of a plurality of gNBs. Thus, either simultaneously or alternatively, the UEs 110 may also connect to the 5G NR-RAN 120 via the gNB 120B. Reference to two gNBs 120A, 120B is merely for illustrative purposes. The exemplary embodiments may apply to any appropriate number of gNBs. Further, the UEs 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UEs 110 to connect to the 5G NR-RAN 120. For example, as discussed above, the 5G NR-RAN 120 may be associated with a particular cellular provider where the UEs 110 and/or the user thereof has a contract and credential information (e.g., stored on a SIM card). Upon detecting the presence of the 5G NR-RAN 120, the UEs 110 may transmit the corresponding credential information to associate with the 5G NR-RAN 120. More specifically, the UEs 110 may associate with a specific base station (e.g., the gNB 120A of the 5G NR-RAN 120).

In addition to the networks 120 and 122 the network arrangement 100 also includes a cellular core network 130. The cellular core network 130 may be considered to be the interconnected set of components that manages the operation and traffic of the cellular network. In this example, the components include a session management function (SMF) 131, an access and mobility management function (AMF) 132, a user plane function (UPF) 133, a policy control function (PCF) 134, an application function (AF) 135, a direct discovery name management function (DDNMF) 136, a network exposure function (NEF) 137, unified data management (UDM) 138, and a unified data repository (UDR) 139. However, an actual cellular core network may include various other components performing any of a variety of different functions.

The SMF 131 performs operations related to session management (SM), UE IP address allocation and management (including optional authorization), selection and control of user plane function; configuring traffic steering at the UPF 133 to route traffic to the proper destination, termination of interfaces toward policy control functions, controlling part of policy enforcement and quality of service (QoS), downlink data notification; initiating access network specific SM information sent via the AMF 132 to the 5G NR RAN 120; and determining session and service continuity (SSC) mode of a session. SM may refer to management of a PDU session. A PDU session may refer to a PDU connectivity service that provides or enables the exchange of PDUs between the UEs 110 and the cellular core network 130. PDU sessions may be established upon request by the UEs 110. Reference to a single SMF 131 is merely for illustrative purposes; an actual network arrangement may include any appropriate number of SMFs, as will be discussed below.

The AMF 132 performs operations related to mobility management such as, but not limited to, paging, non-access stratum (NAS) management and registration procedure management between the UEs 110 and the cellular core network 130. Reference to a single AMF 132 is merely for illustrative purposes; an actual network arrangement may include any appropriate number of AMFs.

The UPF 133 performs operations related to intra-RAT and inter-RAT mobility, an external PDU session point of interconnect to the cellular core network 130, and a branching point to support multi-homed PDU sessions. The UPF 133 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., service data flow (SDF) to QoS flow mapping), transport level packet marking in the uplink and downlink, and downlink packet buffering and downlink data notification triggering. Reference to a single UPF 133 is merely for illustrative purposes; an actual network arrangement may include any appropriate number of UPFs.

The PCF 134 performs operations related to the control plane such as, but not limited to, managing policy rules for control plane functions including network slicing, roaming and mobility management. Reference to a single PCF 134 is merely for illustrative purposes; an actual network arrangement may include any appropriate number of PCFs.

The AF 135 (also referred to herein as "ProSe AF 135") performs operations related to application influence on traffic routing, access to a network cloud engine (NCE), and interaction with the policy framework for policy control. The NCE may be a mechanism that allows the cellular core network 130 and AF 135 to provide information to each other which may be used for edge computing implementations. In such implementations, the network operator and third-party services may be hosted close to the UEs 110 access point of attachment to achieve an efficient service delivery through reduced end-to-end latency and load on the transport network. For edge computing implementations, the cellular core network 130 may select a UPF 133 close to the UEs 110 and execute traffic steering from the UPF 133 to the network. This may be based on the UE subscription data, UE location, and information provided by the AF 135. In this way, the AF 135 may influence UPF (re)selection and traffic routing. Reference to a single AF 135 is merely for illustrative purposes; an actual network arrangement may include any appropriate number of AFs. In some embodiments, the AF 135 may also serve as a ProSe application server.

The DDNMF 136 may be used for handle the mapping of ProSe application IDs used in ProSe direct discovery. In some embodiments, the DDNMF 136 may be a standalone function within the core network 130. In some embodiments, the DDNMF 136 may be part of the application server.

The NEF 137 may provide means for securely exposing the services and capabilities provided by 3GPP network functions for third party application functions (e.g., AF 135), edge computing or fog computing systems, etc. In some embodiments, the NEF 137 may authenticate, authorize, and/or throttle the AFs. The NEF 137 may also translate information exchanged with the AF 135 and information exchanged with other network functions. For example, the NEF 137 may act as a translator between an AF-Service-Identifier and internal 5GC information. The NEF 137 may also receive information from other network functions (NFs) based on exposed capabilities of other network functions. This information may be stored at the NEF 137 as structured data, or at a data storage using standardized interfaces. The stored information can then be re-exposed by the NEF 137 to other AFs, and/or used for other purposes such as analytics.

The UDM 138 may handle subscription-related information to support the network entities' handling of communication sessions and may store subscription data of the UEs 110. For example, subscription data may be communicated between the UDM 138 and the AMF 132. The UDM may include a front end (FE), which is responsible for processing credentials, location management, subscription management, etc. Several different front ends may serve the same user in different transactions. The UDM-FE accesses subscription information stored in the UDR 139 and performs authentication credential processing, user identification handling, access authorization, registration/mobility management, and subscription management.

The UDR 139 may store subscription data and policy data for the UDM 138 and the PCF 134, and/or structured data for exposure and application data (including packet flow descriptions (PFDs) for application detection, application request information for multiple UEs 110) for the NEF 137. The Nudr service-based interface may be exhibited by the UDR 221 to allow the UDM 138, PCF 426, and NEF 423 to access a particular set of the stored data, as well as to read, update (e.g., add, modify, delete), and subscribe to notifications of relevant data changes in the UDR 139.

Figure 2:
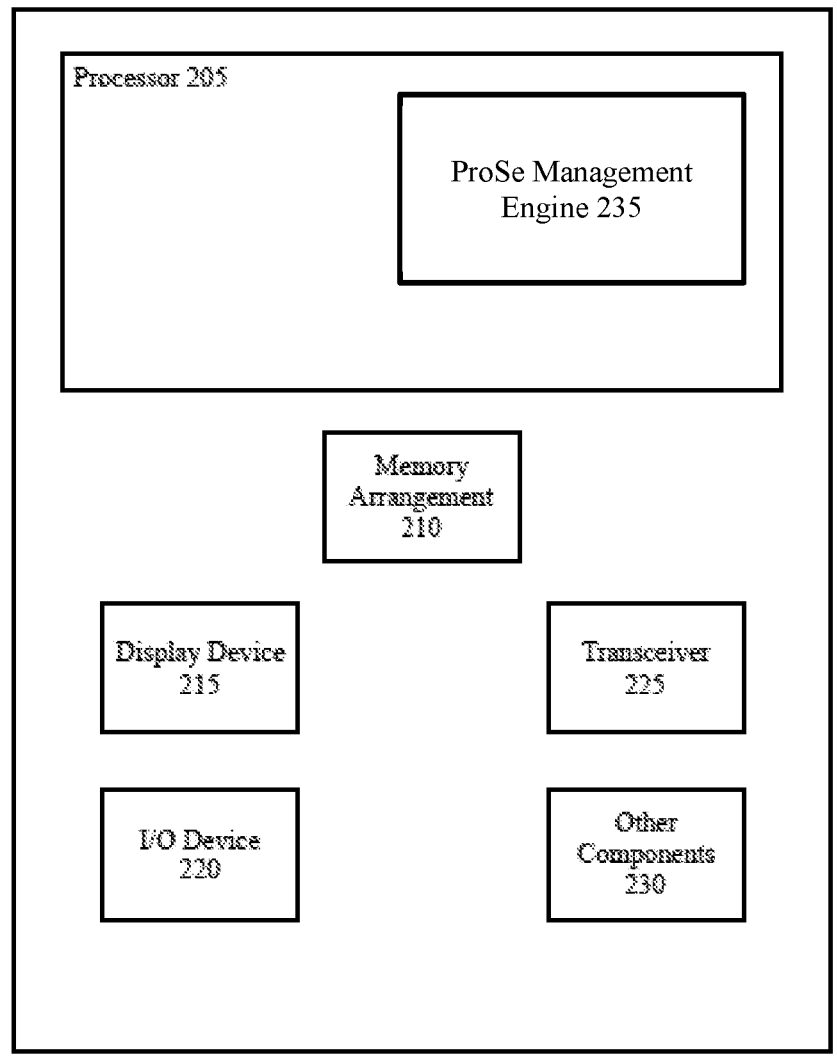
FIG. 2 shows an exemplary UE according to various exemplary embodiments.

FIG. 2 shows an exemplary UE 110 according to various exemplary embodiments. The UEs 110 will be described with regard to the network arrangement 100 of FIG. 1. The UEs 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UEs 110 to other electronic devices, one or more antenna panels, etc. For example, the UEs 110 may be coupled to an industrial device via one or more ports.

The processor 205 may be configured to execute a plurality of engines of the UEs 110. For example, the engines may include a ProSe management engine 235. The ProSe management engine 235 may perform various operations related to ProSe such as, for example, path selection, path switching, and policy update requests.

The above referenced engine being an application (e.g., a program) executed by the processor 205 is only exemplary. The functionality associated with the engine may also be represented as a separate incorporated component of the UEs 110 or may be a modular component coupled to the UEs 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UEs 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3A:
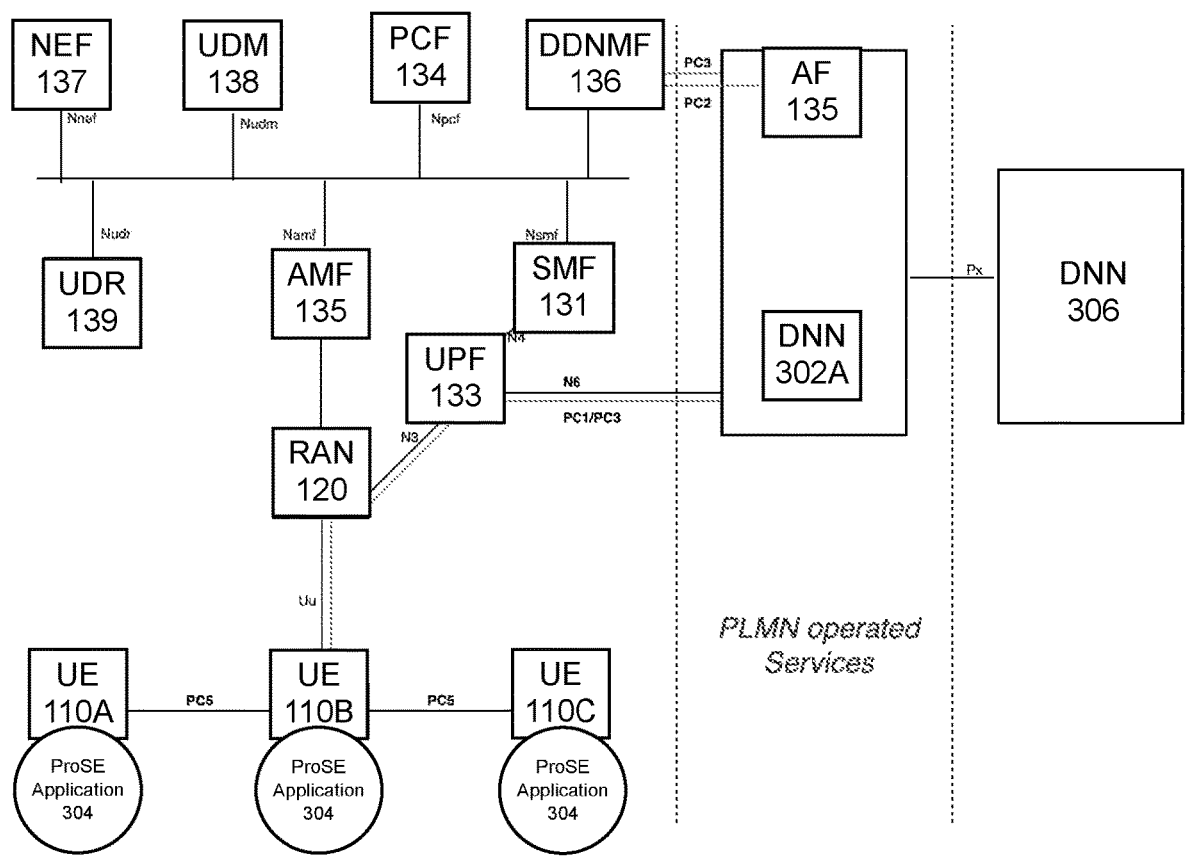
FIGS. 3A and 3B show exemplary network architectures for proximity services according to various exemplary embodiments.
Figure 3B:
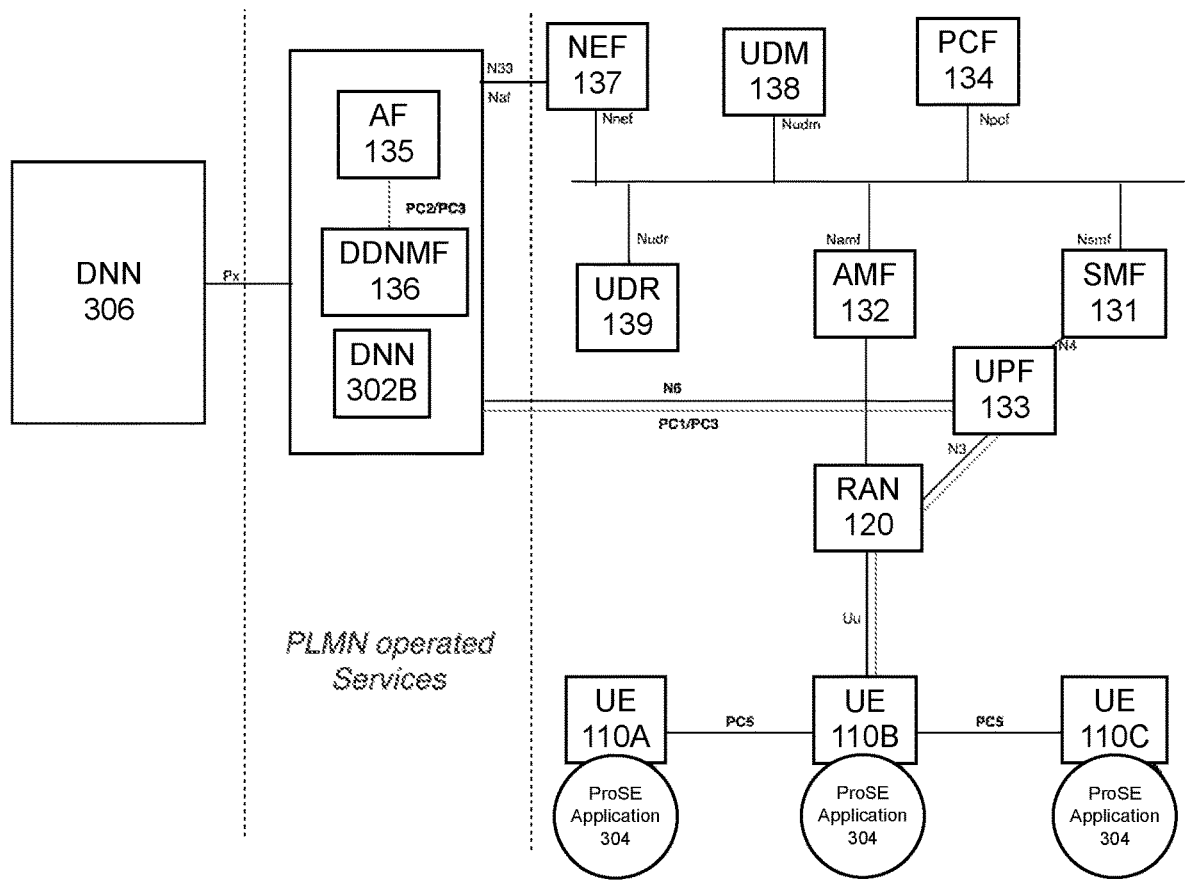

FIGS. 3A and 3B show exemplary network architectures for proximity services according to various exemplary embodiments. The network architectures illustrated in FIGS. 3A and 3B are substantially similar to that of FIG. 1, but show more details relating to proximity services. As explained above with respect to the core network 130, FIGS. 3A and 3B the network functions described above. In addition, the network includes a data network name (DNN) 302 (302A or 302B) that includes the AF 135. The difference between the network architecture of FIG. 3A and that of FIG. 3B is that the DDNMF 136 is a standalone network function on the core network in FIG. 3A and is collocated with the AF 135 on the DNN 302 in FIG. 3B.

Also shown in FIGS. 3A and 3B, are the UEs 110, each of which are running a ProSe application 304. In some embodiments, the first UE 110A may be connected to the RAN 120 via a Uu path/interface while the second and third UEs 110B, 110C may be connected to the first UE 110A via a PC5 path/interface to establish their respective connects to the RAN 120.

In the embodiment of FIG. 3A, in which the DDNMF 136 is a standalone function, the DDNMF interacts with the ProSe Application Server (AF 135) via a PC2 interface and with the UE 110 via a PC3 interface. As defined in 3GPP TS 23.303, PC3 is the interface between the UE and the ProSe Function. PC3 "is used to authorise ProSe Direct Discovery and network-level ProSe Discovery requests, and perform allocation of ProSe Application Codes/ProSe Restricted Codes corresponding to ProSe Application Identities used for ProSe Direct Discovery. It is used to define the authorisation policy per PLMN for ProSe Direct Discovery (for Public Safety and non-Public Safety) and communication (for Public Safety only) between UE and ProSe Function." There can be multiple relationships with 3rd party application service providers for ProSe each having a $3^{rd}$ party application DNN 306A (one shown in FIG. 3A).

In the embodiment of FIG. 3B, in which the DDNMF 136 is collocated with the AF 135 on the DNN 302B, the PC2 interface is supported internally and the DDNMF 136 PC3 interface towards the UE 110B and PC1 interface between application server (a part of DNN) with UE 110. The DDNMF 136 acts as a network function if it needs to utilize service operations provided by other network functions (described above).

As noted above, current UE route selection policy (URSP) rules do not identify which service(s) apply to a particular UE. As such, the UE is left to determine for itself which are applicable. However, for ProSe rules/policies, a policy field of "00000100 ProSe" may be used. ProSe rules may be pushed to UE(s) supporting ProSe features. The 5G core network 130 would provide ProSe rules to UE(s) which have ProSe information element (IE) set to 1 in a registration request. Table 1 shows a list of ProSe path selection and switching (PSS) policies/rules that may be created by the PCF (e.g., PCF 134) in response to a request by the AF 135.

TABLE 1

| PSS Policies | | | |
|---|---|---|---|
| Policy Type | Policy | Values | Impact |
| | PC5 or Uu Policy | PC5/Uu | Policy valid for Uu or PC5 |
| Timing Criteria | Session Validity Timer | Time in Seconds | Session validity, switch request for session after current session |
| | Keep Alive Timer | Time in Seconds | Timer after which communication renewal needed |
| | Backoff Timer | Time in seconds | Backoff timer to avoid repetitive switching between PC5 & Uu |
| | Policy Validation | Time in Seconds | Validity of current policy (Can be different from AF) |
| | Privacy Config | Privacy Service & Timer | Configuration & Timer for privacy for L2-config |
| Location Criteria | Authorized PLMN | PLMN ID/SNPN ID | Authorized PLMN or SNPN ID for validity of other listed policies |
| | Supporting Area in AMF | TA/RAN/RA | Tracking of UE in AMF for policy validity |
| | Geographical Validity | Latitude & Longitude range | Geographical Location for Policy Validity |
| QoS Criteria | Range | Range in Meters | Range to switch in and out of PC5 |
| | QoS Mapping Rules | GFBR/MFBR/AMBR | QoS mapping rules for interface QoS |
| | Authorized RAT | LTE/NR | RAT supporting this policy |
| | Signal Threshold | dBm | Signal threshold for path switching |
| | Frequency/Geographic Area | MHz | Use of frequency limited to a geographical area |
| | Seamless Offload | Seamless/Non-Seamless | Whether or not buffering is needed for handover between PC5 & Uu |
| Service Criteria | Subscription Type | Model, Multicast, Emergency | UE Request/announcement type |
| | Data Type | IP/Non IP | IP type or non-IP type data transfer on interface |
| | Service Identifiers | Groupcast, Broadcast, Unicast | Commercial, Public Safety or MBS service |
| | Special Service Type | URLLC/IIoT | Identifies special application like URLLC or IIoT device |
| | Group Restriction | Application Function ID | In case group access is restricted to an Application ID |
| | Authorization Allowed | 1-1, 1-Many, UE to Relay | Operation Type |
| | Relay UP | NSSAI/DNN | User Plane with NW Slice or DN |

It should be noted that all or a subset of these policies may be utilized for a given ProSe application session. Although the policies in Table 1 are mostly self-explanatory, a brief description of some of these policies will now be made for further clarity and to expound on their impact/relationship with ProSe sessions.

The Session validity timer policy dictates how long a UE can remain in a PC5 session with another UE (or UE to network relay). The Keep alive timer policy dictates a time period after which the UE will need to send a keep alive activity transmission to the DDNMF node through the PC3 interface or other UE (UE to network relay) to let the NW know that the UE is still connected to another UE using PC5. That is, the UE is informing the NW that the UE is still an active UE and should not be disregarded by the NW. The Backoff timer policy sets a limit on the number of times a UE can send a request on a single interface. In case there are 2 UEs that are near the maximum distance in which ProSe can function, if one of the UEs is idle, it is possible that not much will be affected. However, if data is exchanged between the 2 UEs, then the quality of service (QoS) may be negatively impacted. As such, the UE that connects to the other UE (the relay) via PC5 will switch over to Uu to connect to the RAN. At some point however, that UE will try to switch back to proximity mode (PC5). To avoid this back and forth, the backoff timer limits the UE to a specific number of requests on the same interface (PC5 or Uu). The Policy validation policy places a time constraint on the validity of the policy. After the expiration of this time period, the UE may need to switch between interfaces or request a new policy/policy update.

The Authorized PLMN policy dictates in which public land mobile network (PLMN) and/or standalone non-public network (SNPN) these ProSe PSS policies are valid. The Supporting Area in AMF policy limits a UE's ability to use ProSe to a specific RAN area, thus preventing the UE from using ProSe on another AMF or using other policies on another AMF and PCF. The Geographical validity policy defines a geographical area within which a UE may use proximity services which may include a list of latitude and longitude. The PSS policy in Table 1 relate to this defined area. The Signal threshold policy defines a threshold value above which the UE can switch to PC5, if the signal on PCF is above the threshold or Uu, if the Uu signal is above the threshold. The Freq/geographical area policy defines the frequency (licensed or unlicensed spectrum) to be utilized for ProSe communications in a given geographical area. This has to be provided to the UE as criteria for selecting which frequencies it will use for the PC5 and Uu interfaces. The Seamless offload policy dictates whether seamless or non-seamless offload is supported. For example, if the NW is broadcasting and some UEs do not have good connection to a RAN, one UE may serve as a relay for other UEs. However, when other UEs move away from the relay or they move into an improved RAN coverage are, it is necessary to know whether or not buffering is needed.

The Subscription type policy identifies whether a communication is multicast or emergency and following Model A, B or both for ProSe communication. Model A type is an announcement by the UE to other devices that the UE is present. In type B, the UE is already aware of what devices are present and asks if any of those devices would like to connect. Whether or not the NW accepts these models is defined in the subscription type policy. Multimedia Broadcast Multicast Services (MBMS) or Multicast Broadcast Services (MBS) can be used with ProSe &/or emergency broadcast can be used with ProSe applications. The Service Identifiers policy includes groupcast (only within a specified group), broadcast (to any device that can listen), or unicast (UE to UE). Broadcast may include commercial, public safety, or multicast applications.

The Special service type policy identifies whether the application is a special service type such as, for example, a ultra reliable low latency communication (URLLC) application or an industrial internet of things (IIoT) application. There are various special services that may utilize ProSe. For example, for remote surgery, a doctor remotely located from a surgical site (e.g., hospital) connects to the NW via URLLC. One UE at the surgical site also connects to the NW via URLLC and any other devices at the surgical site can connect to that UE via ProSe. This policy would make those devices aware that communications in this session are URLLC and a QoS would be similarly defined.

The Group restriction policy restricts ProSe applications to a specific group (e.g., a specific application ID) by providing application function IDs. The AF 135 provides this information to the PCF 134 to provide these policies to the UE 110. The Authorization allowed policy provides authorization for one-to-one, one-to-many, or UE-to-relay communications. One-to-one includes ProSe communications and may be, for example, URLLC or some other applications that can help UE that is out of coverage connect to the NW. One-to-many may include a UE connecting to multiple UEs to exchange information amongst one another (e.g., for gaming together). UE-to-relay allows a UE to act as relay for connecting other devices to the NW.

The Relay User Plane (UP) policy provides the UE with network slice selection assistance information (NSSAI) or a DNN on which an application is to be used. This policy may also define whether this dedicated network slice should be used for ProSe applications to connect to the NW. For example, if a UE is a relay for other UEs and the UE uses a particular network slice to connect to the NW, the policy would dictate whether or not the UE should use the same network slice for connecting the other devices to the NW or if it should use a different network slice or a DNN to connect those devices to the NW. The policy also identifies which network slice the relay should use for the other devices (this is provided by AF). Also, once QoS and location criteria are satisfied, service criteria policies instructs the UE that once the relay is chosen, access a predetermined slice and/or DNN. So, this policy is more of an instruction to the UE.

Figure 4:
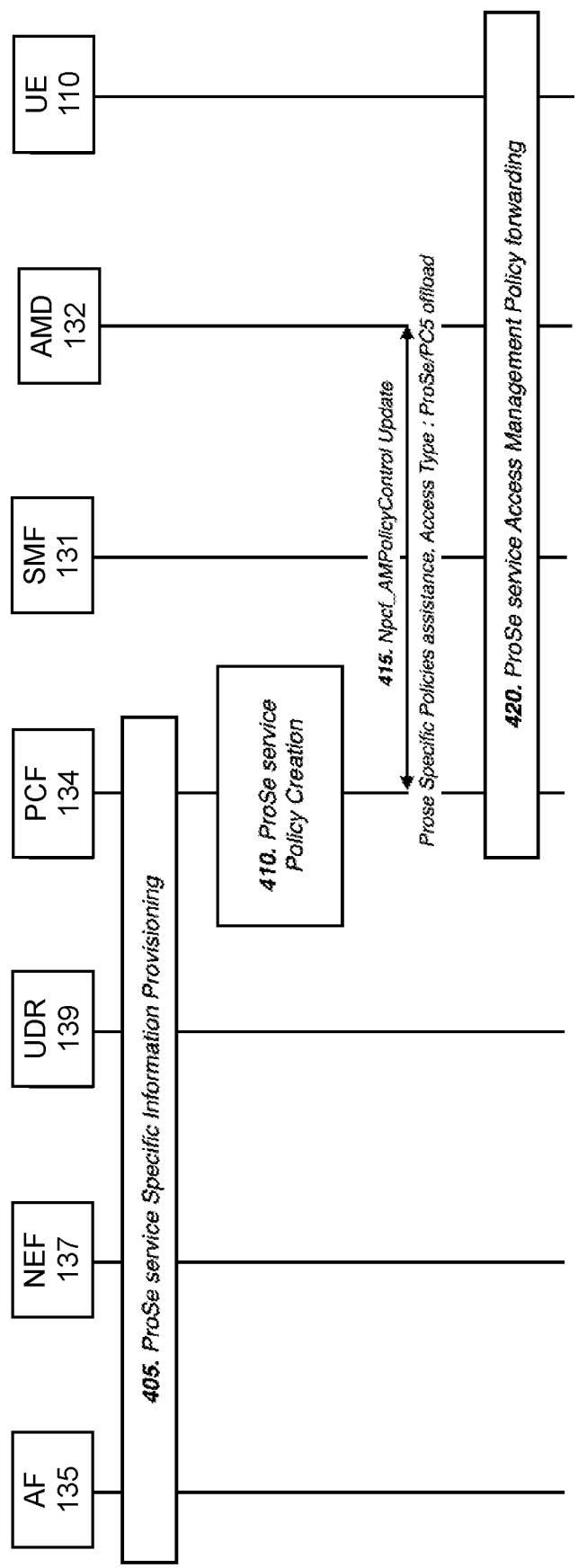
FIG. 4 shows a signaling diagram for policy control function (PCF)-created path selection and switching policies initiated by an application function (AF) according to various exemplary embodiments.

FIG. 4 shows a signaling diagram for PCF-based path selection and switching policies (from Table 1) initiated by the AF according to various exemplary embodiments. It should be noted that, multiple applications may use various different or the same information be provided to the UE via these policies.

At 405, the AF 135 initiates a ProSe service specific information provisioning. In some embodiments, this request may be triggered by the application server (AF 135), forwarded by the DDNMF 136 via a PC2 interface, or received from the UE 110 via a PC3/PC1 interface (user plane (UP) interface) based on triggers. In some embodiments, this could be due to UE registration and policy association. In some embodiments, this could be due to a UE attempting to access certain ProSe applications or some application of ProSe becoming necessary (e.g., relay, extending coverage, etc.) In some embodiments, the AF 135 initiates the request because an application server wants to start a session with the UE 110 and inform the UE 110 that it may use the services provided by the application server. As such, there can be multiple reasons/triggers for causing the AF to initiate the ProSe service specific information provisioning at 405.

At 410, the PCF 134 creates the policy based on the PSS policies discussed above with respect to Table 1 for this specific application instance and application ID. For example, policies for NW-assisted path selection and switching may involve coverage and range, QoS, a time window, positioning in the NW, and/or UE location. For example, if the UE moves out of Uu coverage and ProSe discovery by the UE to the NW relay (another UE) is successful, the UE may switch to the PC5 interface with the relay to continue service. The range (distance) between the two UEs also affects the ability to utilize proximity services. QoS is forwarded from PCF 134 to the UE 110 and the RAN 120 for operation of the PC5 and Uu interfaces in case the UE switches between the interfaces. If the QoS is below a threshold on PC5, the UE 110 may switch to the Uu interface if a better QoS is available on the Uu interface. Likewise, if proximity discovery has occurred and the PC5 interface can provide a reliable QoS, then the UE 110 may switch from the Uu interface to the PC5 interface.

The PCF 134 may also provide a time window during which the UE 110 may utilize a ProSe PC5 interface instead of a Uu interface. The UE 110 may switch from PC5 to Uu after the designated time window has expired. Likewise, the UE 110 may initiate a Uu to PC5 handover when the time has begun in case of a successful proximity discovery. A tracking area (TA) or registration area (RA) list within a PLMN that supports ProSe functionality may be stored on the PCF 134. If the UE 110 moves out of an area defined in these lists, the UE 110 should switch from the PC5 interface to the Uu interface and may also request a policy update from the PCF 134. A ProSe application may also be valid within a limited area defined by latitude and longitude coordinates. The policies may also indicate that a UE operating on the PC5 interface should switch to the Uu interface when the UE 110 moves further away from this area. However, the UE 110 may later initiate another request for a policy update after making the switch from PC5 to Uu.

At 415, the policy created by the PCF 134 is forwarded to the AMF 132 via an AMPolicyControlUpdate message (to which PCF was previously subscribed). At 420, the ProSe service access management policy is forwarded to the UE for this specific application ID and session ID.

Figure 5:
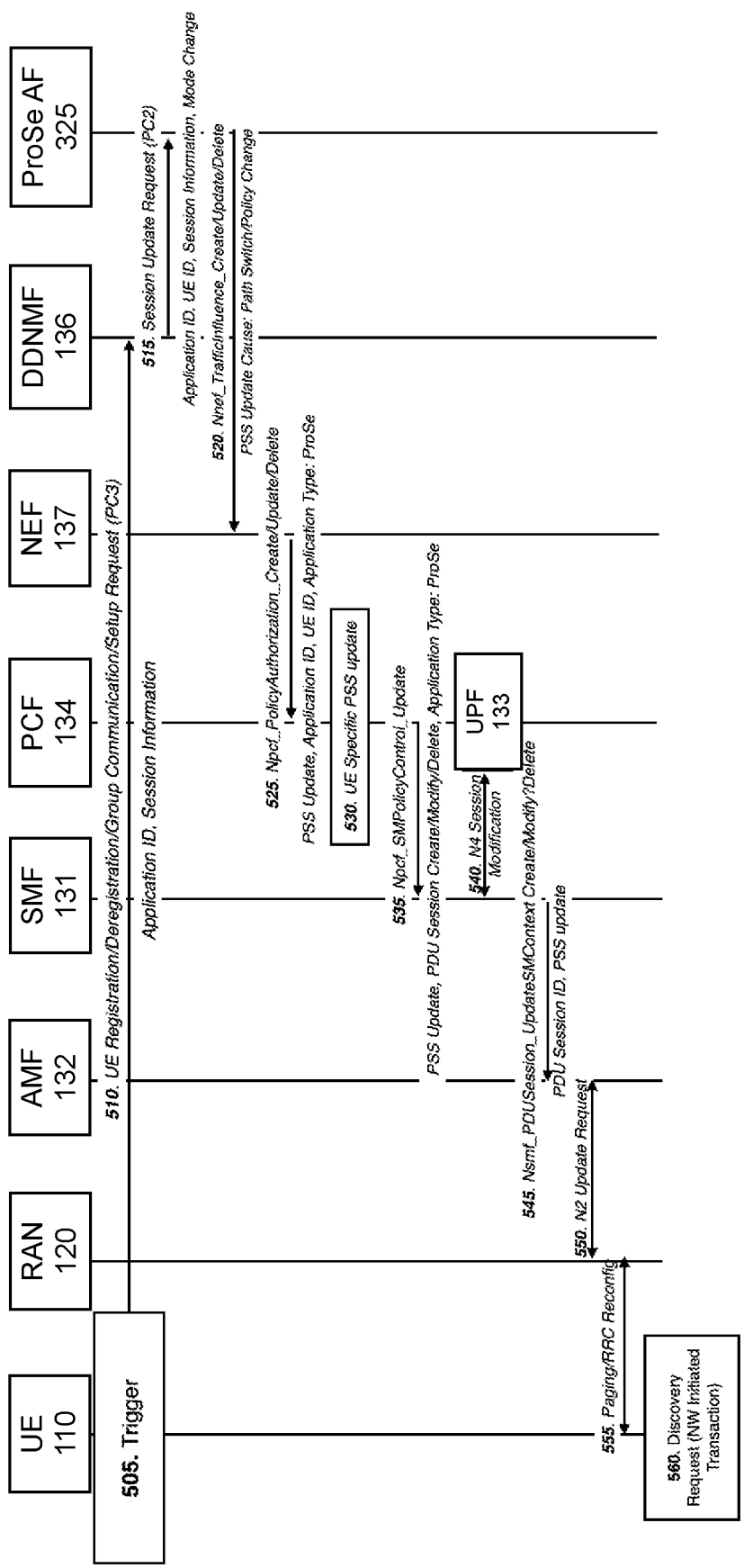
FIG. 5 shows a signaling diagram for network-assisted path selection and switching according to various exemplary embodiments.

FIG. 5 shows a signaling diagram for network-assisted path selection and switching according to various exemplary embodiments. At 505, a triggering event for path switching or selection occurs. In some embodiments, the triggering event at 505 may be an AF triggering event that causes the AF 135 to initiate a ProSe service specific information provisioning as explained above with respect to FIG. 4. In some embodiments, the AF triggering event may be the unavailability of a PC1 link between the UE 110 and the application server (AF 135) due to a UE mobility event. In some embodiments, the AF triggering event may be an application-requested (e.g., an application or third party provider) multimedia broadcast services (MBS) session to enable an MBS relay to broadcast content. In some embodiments, the AF triggering event may be an application-requested commercial broadcast to enable a commercial broadcast pushed to a UE serving as a relay to also be pushed to all UEs served by the relay. In some embodiments, the AF triggering event may be a third party public safety provider application server sending a policy/provisioning update to the ProSe AF 135 so that an emergency broadcast pushed to a UE serving as a relay may also be pushed to all UEs being served by the relay.

In some embodiments, the triggering event at 505 may be a UE triggering event. In some embodiments, if a PDU session has not yet been established with the ProSe AF 135, the UE 110 will establish the PDU session according to a UE configuration such as, for example, using a particular NW slice or connecting to the ProSe AF 135 for that particular application session. In some embodiments, the UE triggering event may be due to the inability of the UE serving as the relay to discover a PC5 interface with a UE in a radio resource control (RRC) idle mode. This would trigger an RRC resume service event or RRC connection setup service event. In some embodiments, the UE triggering event may be due to a wanting to transfer an application session from Uu to PC5 based on proximity discovery. For example, if a first UE is exchanging data with a second UE over the NW and, later, the first UE and second UE are in proximity to one another, one UE may want to switch from Uu to PC5.

In some embodiments, the triggering event at 505 may be a UE-triggered ProSe policy provisioning to the AMF 132. In some embodiments, this may be caused by the expiration of the validity timer indicated in the PSS policies, causing the UE 110 to trigger a request to switch to the Uu interface or request new/updated policies. In some embodiments, the UE-triggered ProSe policy provisioning may be caused by the unavailability of valid parameters, for example, in a geographical area in which the UE is located, or due to some other abnormal situation, which would cause the UE to request updated policies.

In some embodiments, the triggering event at 505 may be a PCF-triggered policy provisioning update. This can be caused by the UE not satisfying one or more of the PSS policies created by the PCF 134. In some embodiments, this is caused by a UE mobility event such as, for example, the UE moving from one PLMN to another PLMN, which occurs when the UE uses the UE Policy Association Modification procedure initiated by the AMF. In some embodiments, the PCF-triggered policy provisioning update may occur when there is a subscription change in the list of PLMNs where the UE is authorized to perform ProSe operations over PC5, which is achieved by using the UE Policy Association Modification procedure initiated by the PCF 134. In some embodiments, the PCF-triggered policy provisioning update may occur when there is a change of a service-specific parameter provisioning.

Returning to FIG. 5, at 510, the UE(s)/relay 110 sends deregistration request or group communication update to the DDNMF 136 using a PC3 interface. It should be noted that this request may or may not be generated depending on which trigger occurred at 505. For example, if the trigger was an AF trigger, the UE(s) request may be skipped. It should also be noted that this request may depend on the number of UEs and UE communications that exist.

At 515, the DDNMF 136 generates a session update request and forwards this request to the AF 135 using the PC2 interface. In some embodiments, the request includes an application ID, a user ID, a session ID and other ProSe session parameters. Regardless of whether the DDNMF is a standalone function or if it is collocated with the AF 135, the connectivity between the DDNMF 136 and the AF 135 remains the same.

At 520, the AF 135 invokes a traffic influence request for the application ID and session ID with request type ProSe discovery or switch or Policy Change depending on the trigger type at 505 and the node (UE or AF) at which trigger was generated. As a result, the AF 135 initiates traffic influence for path switching and policy changes. At 525, the NEF 137 forwards the request to the relevant PCF 134 as Policy Authorization Create/Modify/Delete depending on the nature of the request and switch types (Uu to PC5 or PC5 to Uu), which was received from the AF 135.

At 530, the UE-specific PSS policy update is generated/modified by the PCF 134. The policy(ies) may be updated based on the PSS policies in Table 1. At 535, the PCF 134 forwards the policy update with PSS Update, application type and other session information to the SMF 131 for further processing with a PDU session using the SMPolicy Control message. At 540, an N4 session is modified at the UPF level with the policy changes and the UP tunnel is created, modified, torn down depending on the request type, trigger type, or application type.

At 545, a PDU session update is forwarded to the AMF 132 from the SMF 131 for further processing of the request. At 550, the AMF 132 sends an N2 update message to the RAN 120 for updating the Policy at the RAN level and forwarding the policies to the specific UE 110.

At 555, depending on the state of the UE(s) and existing connections, the RAN 120 can send a paging request within the area in which the UE 110 was/is located. If the UE 110 was in idle state or was using PC5, the UE 110 would need to be paged to connect to the RAN 120 via Uu. If the UE 110 was using Uu and wants to switch to PC5, the RAN 120 would initiate an RRC reconfiguration. At 560, as per the policy, state, and trigger, the switching and selection of the interface (PC5 or Uu) is performed now at UE(s)/Relay level and a discovery request may be initiated at this step. However, if the UE 110 is already utilizing the PC5 interface and is switching to the Uu interface at 560, then the RRC reconfiguration request may be initiated (instead of a discovery request).

Figure 6:
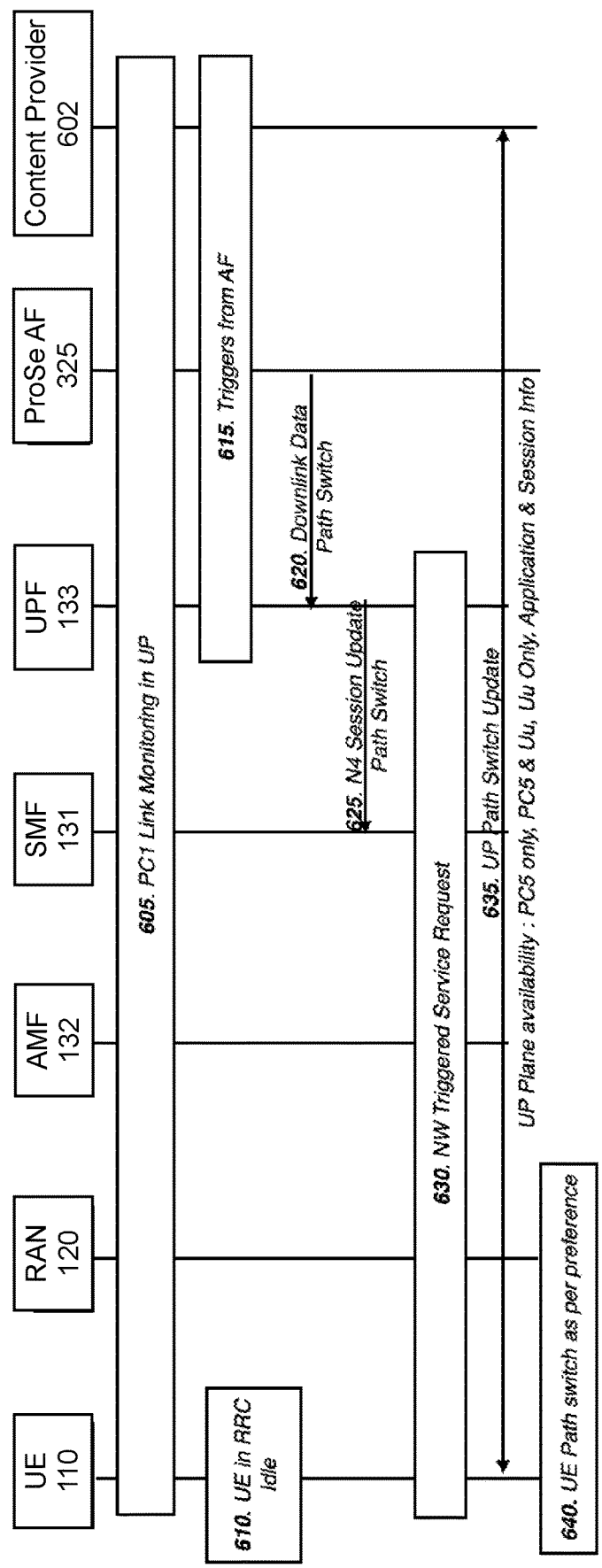
FIG. 6 shows a signaling diagram for application-assisted path selection and switching according to various exemplary embodiments.

FIG. 6 shows a signaling diagram for application-assisted path selection and switching according to various exemplary embodiments. Initially, it should be noted that if the content provider 602 shown in FIG. 6 is outside of the 5G NW domain, then this signaling diagram would terminate at the ProSe AF 135. However, in this discussion, it is assumed that the content provider 602 is within the 5G NW domain.

At 605, PC1 link monitoring is active between the UE(s) 110 and the application server (the AF 135) or the content provider 602. At 610, the UE 110 is in an RRC idle state. However, a PC5 link may be active between this UE 110 and a relay (another UE). At 615, conditions for a triggering event may be satisfied at the application server (the AF 135) or the content provider 602 pertaining to a switch from a PC5 to a Uu unicast link or vice versa. At 620, the AF 135 forwards downlink data with a request type path switch & other content delivery using a PDU session in the UP. It should be noted that this request may be to perform a unicast operation with Uu or enable a relay operation with a Uu to PC5 switch. At 625, this request is forwarded as an N4 message for a session update from the UPF 133 to the SMF 131.

At 630, the NW triggers a service request to page the UE 110 for unicast delivery. The service request requests that the UE switch from PC5 to Uu depending on whether the UE was unreachable or did not perform link monitoring due to an application state. At this point, the NW can trigger service request or ping the UE 110 to request that the UE 110 switch interfaces to receive data from the content provider 602 intended for the UE 110. In some embodiments, the NW requests that the UE 110 remain on PC5, but start sending the link monitoring request. In some embodiments, the NW requests that the UE 110 use both PC5 and Uu concurrently, although the UE 110 chooses one interface based on UE policy. In some embodiments, the NW may request that the UE switch to Uu because the data from the content provider 602 may be transmitted through the RAN 120.

At 635, the UP path switch between the UE 110 and application server or content provider is updated after a delivery link is established. At 640, the UE 110 performs the path switching based on the UE's preference (based on PSS policies).

Figure 7:
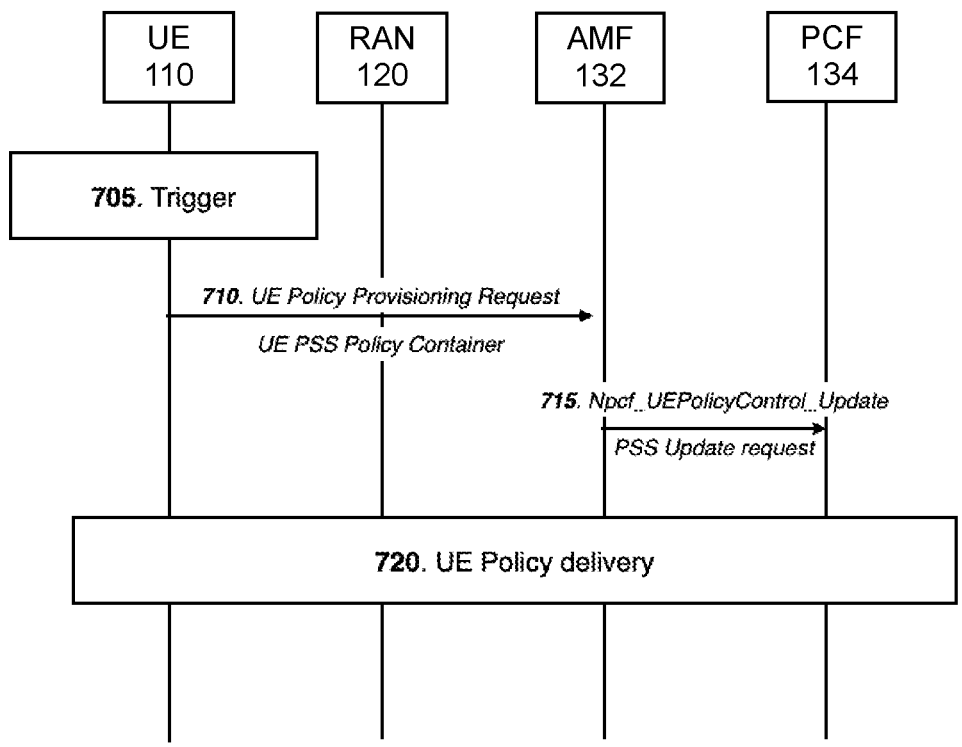
FIG. 7 shows a signaling diagram for a UE-requested policy provisioning update according to various exemplary embodiments.

FIG. 7 shows a signaling diagram for a UE-requested policy provisioning update according to various exemplary embodiments.

At 705, a UE triggering event occurs. The triggering event may be based on any of the PSS policies of Table 1 or any other policies being triggered at the UE 110 such as, for example, the UE-triggering events discussed above. In some embodiments, the UE triggering event may be something as simple as initiating an application. At 710, the UE sends the UE policy provisioning request, including the UE policy container (ProSe PSS Policy Provisioning Request), to the AMF 132.

At 715, the AMF 132 sends the update request (Npcf_U-EPolicyControl_Update) to the PCF 134, including the UE Policy Container received from UE 110 at 710. At 720, the UE policy delivery/update procedure defined in 3GPP TS 23.502 section 4.2.4.3 is triggered. The PCF 134 may determine whether or not new policies are used. If the PCF 134 determines that there are no new UE policy updates for this session, then ProSe are not available to the UE for this application and the UE 110 uses the Uu interface to connect to the NW. If, however, the PCF 134 determines that there are new policies, it can update the UE at 720.

Figure 8:
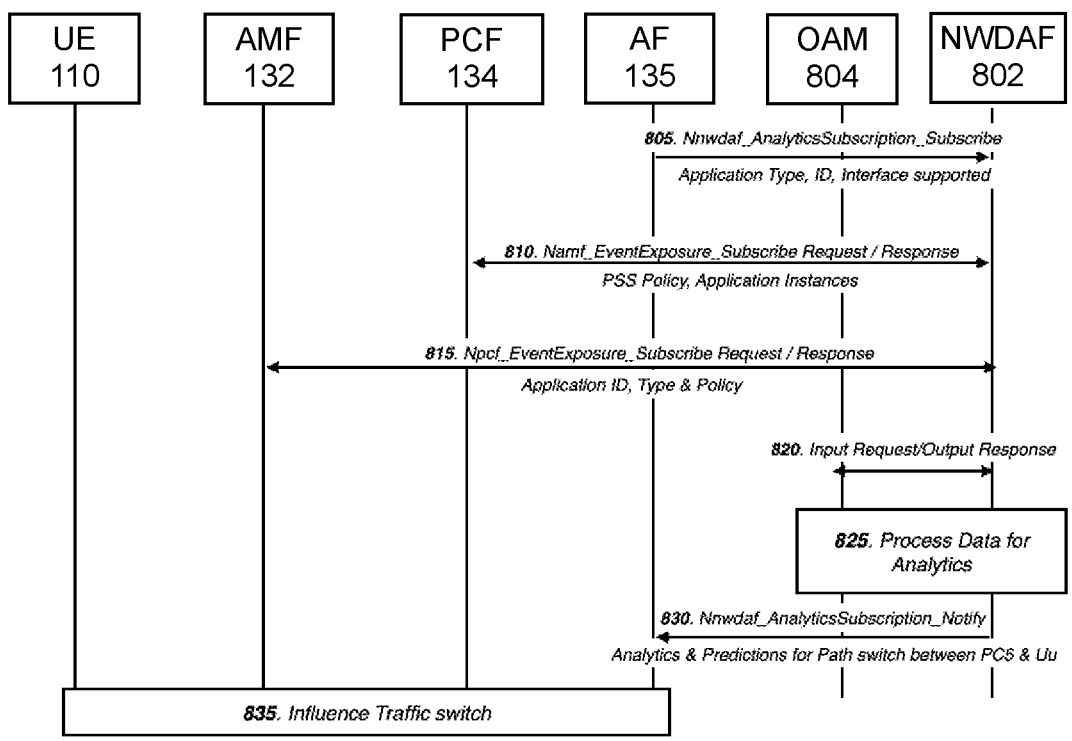
FIG. 8 shows a signaling diagram for a networks data analytics function (NWDAF)-based path selection and switching analytics and predictions according to various exemplary embodiments.

FIG. 8 shows a signaling diagram for a networks data analytics function (NWDAF)-based path selection and switching analytics and predictions according to various exemplary embodiments. At 805, the AF 135 may subscribe to the analytics and predictions request from the NWDAF 802 to provide details which might help in generating efficient triggers and policies for respective UE(s). That is, the AF 135 requests that the NWDAF 802 provide analytics on the basis of specific functions such as, for example, coverage enhancement with a relay, congestion mitigation, data that is application-specific (e.g., which applications do and do not require ProSe). In some embodiments, this subscription request may include the application type, the application ID, and the interface supported. At 810, the NWDAF 802 subscribes to the UE policies, application policies, and triggers from the PCF 134.

In some embodiments, this subscription request may include PSS policy and application instances. At 815, the NWDAF 802 further subscribes to UE(s) mobility information from the AMF 132 (e.g., where the UE 110 was/is, where the UE 110 moves, in which registration area or tracking area has the UE been, etc.) to generate patterns with respective UE IDs to map for congestion mitigation and efficient analytics provisioning for different times of day. In some embodiments, this subscription request may include UE app IDs and UE(s) mobility information. In some embodiments, the NWDAF 802 may request this information from the UE 110. However, this would require the UE to accept to share application and location data with the NWDAF.

At 820, the NWDAF 802 prepares the analytics for the data with further inputs from an operations, administration and management/maintenance (CAM). At 825, the NWDAF 802 performs data analysis based on UE mobility patterns, policies, application types and interfaces used. At 830, the NWDAF 802 forwards the analysis to the AF 135. In some embodiments, the analysis may include UE interface usage, time(s) of day, application utility, interface (PC5/Uu) usage details, congestion mitigation, and relay enablement/UE group communication patterns. At 835, the AF 135 can renegotiate/change the PSS policies based on the analysis and predictions received at 830, depending on UE mobility, the time of day, and interface usage. In some embodiments, the AF 135 may also modify the triggers discussed above.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. The non-transitory computer readable storage medium comprising a set of instructions, wherein the set of instructions when executed by a processor cause the processor of a user equipment (UE) to perform operations, comprising:
    determining that a triggering event has occurred, wherein the triggering event is based on a set of proximity services (ProSe) path selection and switching (PSS) policies;
    transmitting a setup or update request to a direct discovery name management function (DDNMF) of a 5G core network;
    receiving UE-specific policies based on the set of ProSe PSS policies; and
    switching from one of a PC5 interface or a Uu interface to another one of the PC5 interface or the Uu interface.

2. The non-transitory computer readable storage medium of claim 1, wherein the triggering event is a UE-triggering event.

3. The non-transitory computer readable storage medium of claim 1, wherein the triggering event is an application function (AF)-triggering event.

4. The non-transitory computer readable storage medium of claim 1, wherein the ProSe PSS policies are created by a policy control function (PCF) of the 5G core network in response to a request by an AF of the 5G core network.

5. The non-transitory computer readable storage medium of claim 4, wherein the ProSe PSS policies include at least one of timing criteria, location criteria, QoS criteria, and service criteria.

6. The non-transitory computer readable storage medium of claim 1, wherein the UE-specific policies received are an update to policies already being used by the UE.

7. The non-transitory computer readable storage medium of claim 1, wherein the DDNMF is a standalone function on the 5G core network.

8. The non-transitory computer readable storage medium of claim 1, wherein the DDNMF is collocated with an AF of the 5G core network.

9. The non-transitory computer readable storage medium of claim 1, wherein the UE-specific policies include an authorization for the UE to serve as a relay for connecting one or more other UEs to a 5G new radio (NR) network.

10. A user equipment (UE), comprising:
    a transceiver configured to connect to a next generation nodeB (gNB) and further UE; and
    a processor configured to:
        determine that a triggering event has occurred, wherein the triggering event is based on a set of proximity services (ProSe) path selection and switching (PSS) policies;
        transmit a setup or update request to a direct discovery name management function (DDNMF) of a 5G core network;
        receive UE-specific policies based on the set of ProSe PSS policies; and
        switch from one of a PC5 interface to connect with the further UE or a Uu interface to connect to the gNB to another one of the PC5 interface or the Uu interface.

11. The UE of claim 10, wherein the triggering event is a UE-triggering event.

12. The UE of claim 10, wherein the triggering event is an application function (AF)-triggering event.

13. The UE of claim 10, wherein the ProSe PSS policies are created by a policy control function (PCF) of the 5G core network, wherein the ProSe PSS policies include at least one of timing criteria, location criteria, QoS criteria, and service criteria.

14. The UE of claim 13, wherein the PCF creates the ProSe PSS policies in response to a request by an AF of the 5G core network.

15. The UE of claim 10, wherein the UE-specific policies received are an update to policies already being used by the UE.

16. The UE of claim 10, wherein the DDNMF is a standalone function on the 5G core network.

17. The UE of claim 10, wherein the DDNMF is collocated with an AF of the 5G core network.

18. The UE of claim 10, wherein the UE-specific policies include an authorization for the UE to serve as a relay for connecting one or more other UEs to a 5G new radio (NR) network.

19. An integrated circuit configured for use in a user equipment (UE), comprising:
    circuitry configured to determine that a triggering event has occurred, wherein the triggering event is based on a set of proximity services (ProSe) path selection and switching (PSS) policies;
    circuitry configured to transmit a setup or update request to a direct discovery name management function (DDNMF) of a 5G core network;
    circuitry configured to receive UE-specific policies based on the set of ProSe PSS policies; and
    circuitry configured to switch from one of a PC5 interface to connect with another UE or a Uu interface to connect to a next generation NodeB (gNB) to another one of the PC5 interface or the Uu interface.

20. The integrated circuit of claim 19, wherein the triggering event is one of a UE-triggering event or an application function (AF)-triggering event.

* * * * *